United States Patent
Suga

(10) Patent No.: US 11,959,518 B2
(45) Date of Patent: Apr. 16, 2024

(54) SLIDING MEMBER

(71) Applicant: TAIHO KOGYO CO., LTD., Toyota (JP)

(72) Inventor: Shigeyuki Suga, Toyota (JP)

(73) Assignee: TAIHO KOGYO CO., LTD., Toyota (JP)

( * ) Notice: Subject to any disclaimer, the term of this patent is extended or adjusted under 35 U.S.C. 154(b) by 361 days.

(21) Appl. No.: 17/422,316

(22) PCT Filed: Sep. 19, 2019

(86) PCT No.: PCT/JP2019/036772
§ 371 (c)(1),
(2) Date: Aug. 18, 2021

(87) PCT Pub. No.: WO2020/166119
PCT Pub. Date: Aug. 20, 2020

(65) Prior Publication Data
US 2022/0090631 A1    Mar. 24, 2022

(30) Foreign Application Priority Data
Feb. 15, 2019   (JP) ................................. 2019-025556

(51) Int. Cl.
*F16C 33/12*   (2006.01)
*B32B 15/01*   (2006.01)
(Continued)

(52) U.S. Cl.
CPC ............ *F16C 33/12* (2013.01); *B32B 15/017* (2013.01); *C25D 5/10* (2013.01); *C25D 7/10* (2013.01);
(Continued)

(58) Field of Classification Search
None
See application file for complete search history.

(56) References Cited

U.S. PATENT DOCUMENTS

2004/0241489 A1   12/2004   Kawachi et al.
2008/0102307 A1*   5/2008   Zidar .................... C23C 28/023
                                          428/642
(Continued)

FOREIGN PATENT DOCUMENTS

CN          102094900 A      6/2011
JP           3693256 B2      9/2005
(Continued)

OTHER PUBLICATIONS

Extended European Search Report dated Oct. 25, 2022 in European Application No. 19915145.7.
(Continued)

*Primary Examiner* — Xiaobei Wang
(74) *Attorney, Agent, or Firm* — Sughrue Mion, PLLC

(57) ABSTRACT

A technique capable of reducing the possibility of generation of a Cu—Sb compound in an overlay and the possibility of delamination between layers. A sliding member includes: an overlay including an alloy plating film of Bi and Sb; a lining including an Al alloy; a first intermediate layer including Cu
(Continued)

as a main component, and laminated on the lining; and a second intermediate layer including Ag as a main component, and connecting the first intermediate layer and the overlay.

3 Claims, 3 Drawing Sheets

(51) Int. Cl.
    *C25D 5/10*     (2006.01)
    *C25D 7/10*     (2006.01)

(52) U.S. Cl.
    CPC .............. *Y10T 428/12681* (2015.01); *Y10T 428/12715* (2015.01); *Y10T 428/1275* (2015.01); *Y10T 428/12882* (2015.01)

(56) References Cited

U.S. PATENT DOCUMENTS

| | | |
|---|---|---|
| 2010/0248999 A1 | 9/2010 | Izumida et al. |
| 2010/0266869 A1 | 10/2010 | Yasui et al. |
| 2013/0051715 A1 | 2/2013 | Zidar |
| 2019/0203769 A1 | 7/2019 | Suga |

FOREIGN PATENT DOCUMENTS

| | | |
|---|---|---|
| JP | 2008-057769 A | 3/2008 |
| JP | 2010-222647 A | 10/2010 |
| JP | 2010-249216 A | 11/2010 |
| WO | 2019/017182 A1 | 1/2019 |

OTHER PUBLICATIONS

Office Action dated Aug. 2, 2022 issued by the Japanese Patent Office in Japanese Application No. 2019-025556.
International Search Report of PCT/JP2019/036772 dated Nov. 12, 2019 [PCT/ISA/210].
Written Opinion of PCT/JP2019/036772 dated Nov. 12, 2019 [PCT/ISA/210].
European Office Action dated Aug. 4, 2023 in Application No. 19 915 145.7.
Chinese Office Action dated Dec. 16, 2023 in Chinese Application No. 201980089551.0.

\* cited by examiner

SLIDING MEMBER

CROSS REFERENCE TO RELATED APPLICATIONS

This application is a National Stage of International Application No. PCT/JP2019/036772, filed Sep. 19, 2019, claiming priority to Japanese Patent Application No. 2019-025556, filed Feb. 15, 2019.

TECHNICAL FIELD

The present invention relates to a sliding member including an overlay of an alloy plating film of Bi and Sb.

BACKGROUND ART

A sliding member is known that includes an overlay including a coating layer of Bi and an intermediate layer of Ag (see Patent Literature 1). In Patent Literature 1, the size of a crystal grain of Ag in the intermediate layer is adjusted to improve the interlayer adhesion in the overlay. Furthermore, the size of a crystal grain of Bi in the coating layer is adjusted to improve the interlayer adhesion and the fatigue resistance in the overlay.

CITATIONS LIST

Patent Literature

Patent Literature 1: Japanese Patent No. 3693256

SUMMARY OF INVENTION

Technical Problems

However, in Patent Literature 1, there has been a problem that in the case that an Al alloy is formed into a bearing alloy layer, delamination occurs between the bearing alloy layer of the Al alloy and the intermediate layer of Ag. This is because the adhesion between the Al alloy and the Ag plating film is poor.

Furthermore, there has been a problem that use of a configuration in which Cu and Sb coexist in an overlay layer as in Patent Literature 1 leads to formation of a Cu—Sb compound in the overlay layer, and the Cu—Sb compound causes deterioration of the fatigue resistance.

The present invention has been made in view of the above-described problems, and an object of the present invention is to provide a technique capable of reducing the possibility of generation of a Cu—Sb compound in an overlay and the possibility of delamination between layers.

Solutions to Problems

In order to achieve the above-described object, the sliding member of the present invention includes: an overlay including an alloy plating film of Bi and Sb; a lining including an Al alloy; a first intermediate layer including Cu as a main component, and laminated on the lining; and a second intermediate layer including Ag as a main component, and connecting the first intermediate layer and the overlay.

In the above-described configuration, the overlay includes not only soft Bi but also hard Sb, and as a result, the hard Sb can improve the fatigue resistance and the wear resistance. Here, Cu has a property of diffusing into Sb more easily than into Bi. If the average concentration of Sb in the overlay is increased (for example, 3% by mass or more), Cu diffused from the first intermediate layer into the overlay may reduce the fatigue resistance.

Meanwhile, by interposing the second intermediate layer including Ag, which serves as a diffusion barrier of Cu, as a main component between the first intermediate layer and the overlay, it is possible to reduce the amount of Cu diffused from the first intermediate layer including Cu as a main component into the overlay to reduce the possibility of deterioration in the fatigue resistance. Furthermore, by interposing the first intermediate layer including Cu as a main component between the second intermediate layer including Ag as a main component and the lining including an Al alloy, it is possible to reduce the possibility of delamination between the second intermediate layer and the lining.

DESCRIPTION OF EMBODIMENTS

Figure 1:
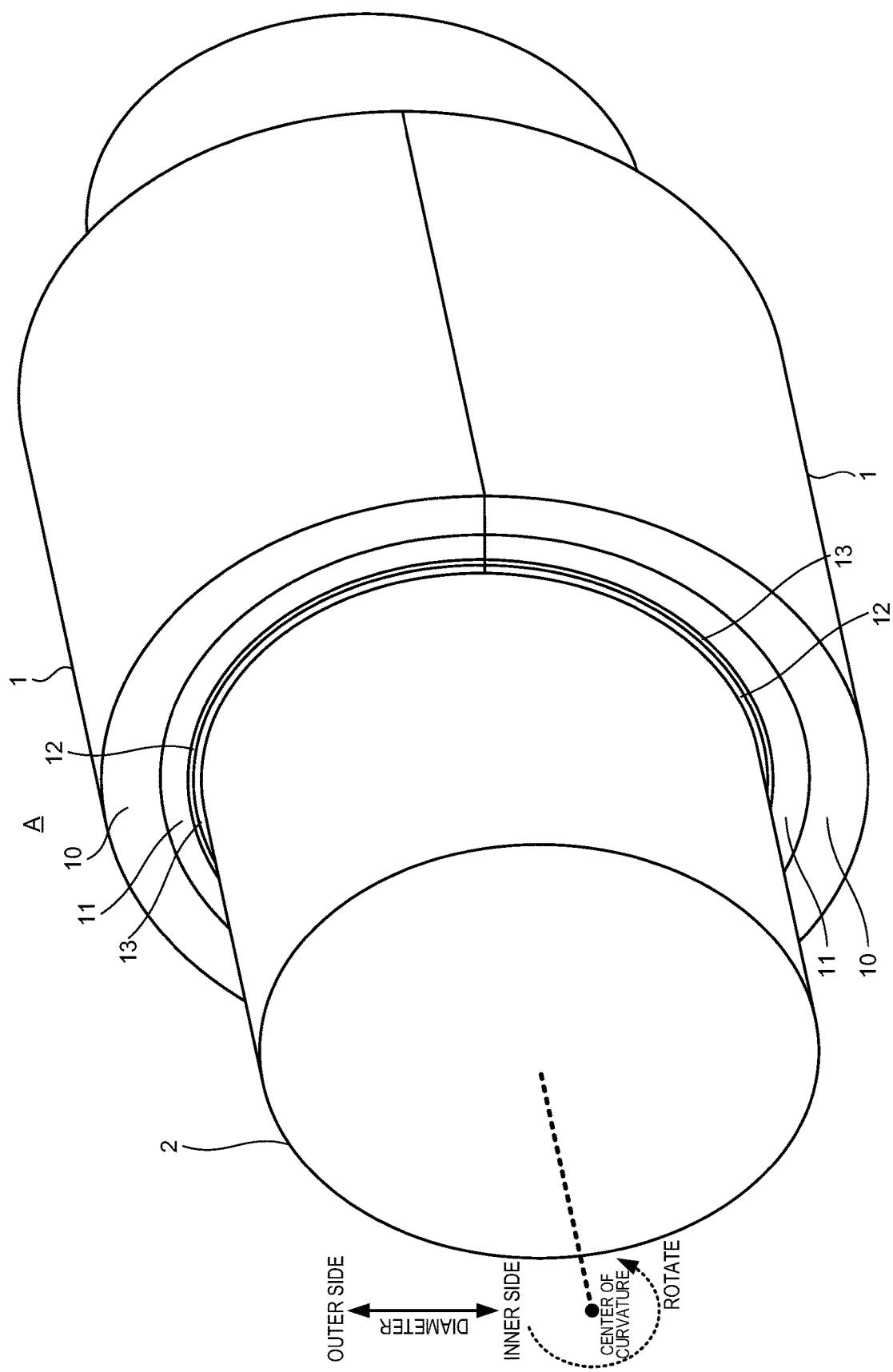
FIG. 1 is a perspective view of sliding members according to an embodiment of the present invention.

Here, embodiments of the present invention will be described in the following order.
(1) First embodiment:
(1-1) Configuration of sliding member:
(1-2) Method for manufacturing sliding member:
(2) Experimental results:
(3) Other embodiments:

(1) First Embodiment (1-1) Configuration of Sliding Member:

FIG. 1 is a perspective view of sliding members 1 according to one embodiment of the present invention. The sliding member 1 includes a back metal 10, a lining 11, an intermediate layer 12, and an overlay 13. The sliding member 1 is a metal member having a halved cylindrical shape obtained by dividing a hollow cylinder into two equal parts in a diameter direction, and has a semicircular arc cross section. Two sliding members 1 are combined into a cylindrical shape to form a sliding bearing A. The sliding bearing A bears a cylindrical mating shaft 2 (crankshaft of an engine) in a hollow portion formed inside. The mating shaft 2 is formed to have an outer diameter slightly smaller than the inner diameter of the sliding bearing A. The gap formed between the outer peripheral surface of the mating shaft 2 and the inner peripheral surface of the sliding bearing A is supplied with a lubricating oil (engine oil). At that time, the outer peripheral surface of the mating shaft 2 slides on the inner peripheral surface of the sliding bearing A.

Figure 2:
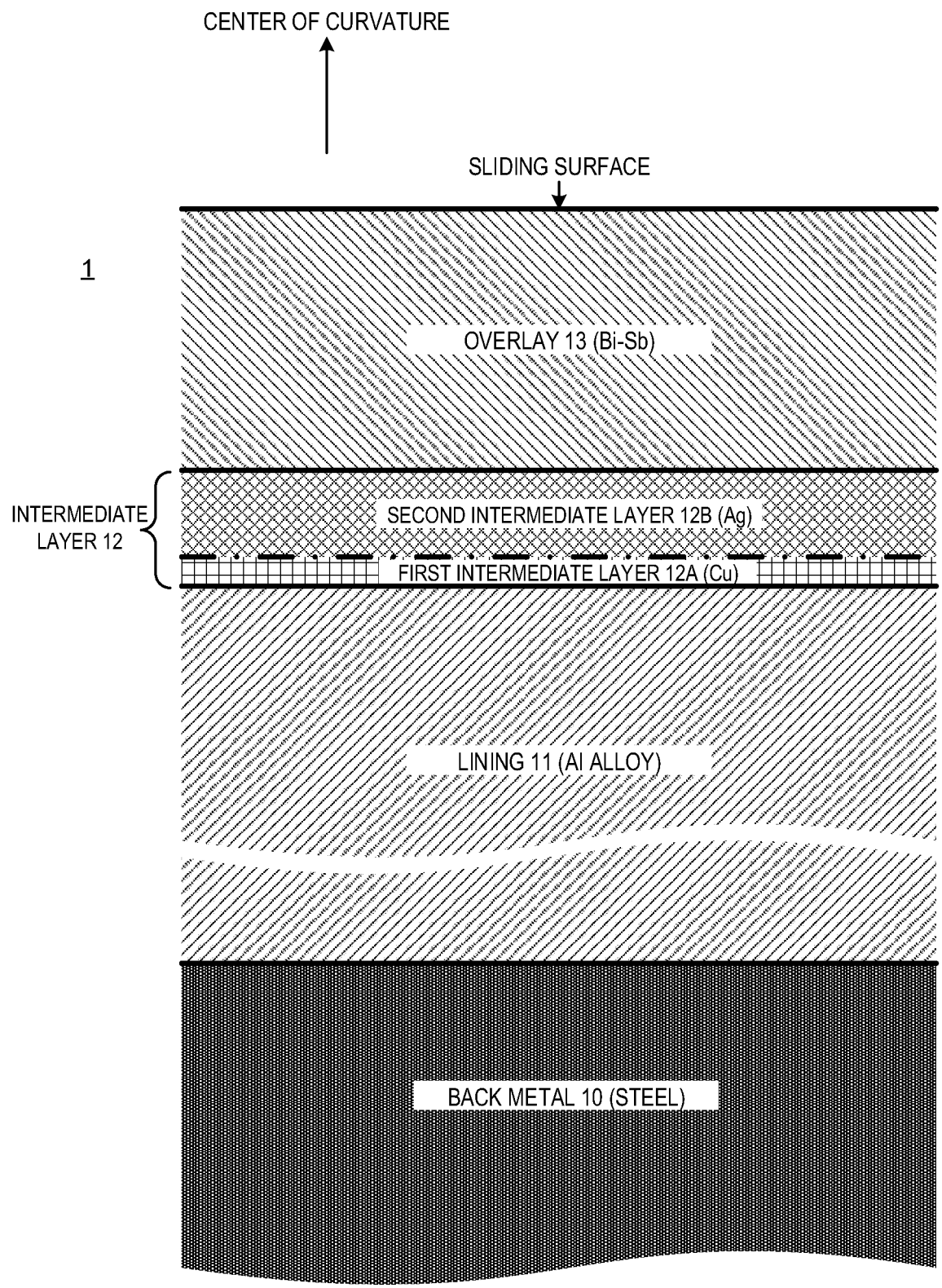
FIG. 2 is a schematic sectional view of a sliding member.

FIG. 2 is a schematic sectional view of the sliding member 1. The sliding member 1 has a structure in which the back metal 10, the lining 11, the intermediate layer 12, and the overlay 13 are stacked in this order from the side that is the farthest from the center of curvature. Therefore, the back metal 10 constitutes the outermost layer of the sliding member 1, and the overlay 13 constitutes the innermost layer of the sliding member 1. The back metal 10, the lining 11, the intermediate layer 12, and the overlay 13 each have a substantially constant thickness in the circumferential direction. The back metal 10 has a thickness of 1.8 mm, the lining 11 has a thickness of 0.2 mm, the intermediate layer 12 has a thickness of 6.0 μm, and the overlay 13 has a thickness of 15 µm. Twice the radius of a semicircle formed by the surface of the overlay 13 on the side closer to the center of curvature (the inner diameter of the sliding member 1) is 40 mm. The sliding bearing A has a width of 20 mm. Hereinafter, the term "inner side" means the side closer to the center of curvature of the sliding member 1, and the term "outer side" means the side opposite from the center of curvature of the sliding member 1. The inner side surface of the overlay 13 constitutes a sliding surface for the mating shaft 2.

The back metal 10 includes low-carbon steel containing 0.15% by mass of C, 0.06% by mass of Mn, and the rest including Fe. The back metal 10 is to include a material capable of supporting a load from the mating shaft 2 via the lining 11 and the overlay 13, and is not necessarily to include low-carbon steel.

The lining 11 is a layer laminated on the inner side of the back metal 10. The lining 11 includes an Al alloy, and contains 7% by mass of Sn, 3% by mass of Si, and the rest including Al and an inevitable impurity. The inevitable impurity of the lining 11 is, for example, Mg, Ti, B, Pb, or Cr, and is mixed during refining or scrapping. The content of the inevitable impurity in the lining 11 is 0.5% by mass or less in total. The lining 11 is to include an Al alloy containing Al as a main component, and the composition of the Al alloy is not particularly limited.

The intermediate layer 12 includes a first intermediate layer 12A and a second intermediate layer 12B. The first intermediate layer 12A includes Cu as a main component, and the first intermediate layer 12A is laminated on the lining 11. The second intermediate layer 12B includes Ag as a main component, and connects the first intermediate layer 12A and the overlay 13. In the present embodiment, the first intermediate layer 12A includes pure Ag, and the second intermediate layer 12B includes pure Cu. The content of the inevitable impurity in the intermediate layer 12 is 0.5% by mass or less in total. The first intermediate layer 12A has a thickness of 1 µm, and the second intermediate layer 12B has a thickness of 5 µm.

The overlay 13 is a layer laminated on the inner side surface of the intermediate layer 12. The overlay 13 is an alloy plating film of Bi and Sb. The overlay 13 includes Bi, Sb, and an inevitable impurity. The overlay 13 includes Sb at a content of 5.5% by mass and the rest including Bi and the inevitable impurity. The concentration of Sb in the overlay 13 was measured with energy dispersive X-ray spectroscopy using an electron probe microanalyzer (JMS-6610A manufactured by JEOL Ltd.). The content of the inevitable impurity in the overlay 13 is 0.5% by mass or less in total.

A fatigue test piece (connecting rod R) was prepared that was formed in the same manner as the sliding member 1 described above, and the fatigue area rate after the fatigue test was measured. As the result, the fatigue area rate was as good as 4%. The connecting rod R had an inner diameter of 40 mm and a width of 20 mm.

Figure 3:
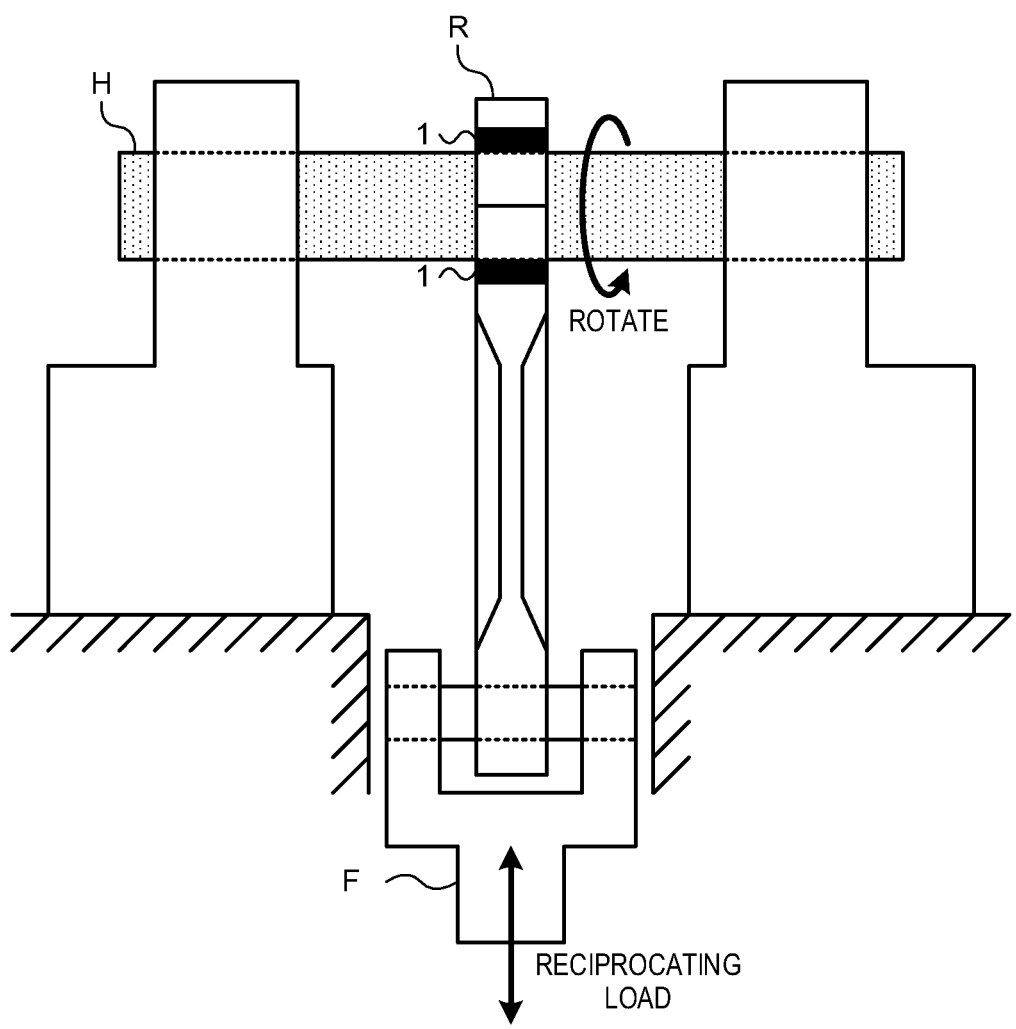
FIG. 3 is an explanatory diagram of a fatigue test.

The fatigue area rate was measured with the following procedure. FIG. 3 is an explanatory diagram of a sliding tester. First, as shown in FIG. 3, a connecting rod R was prepared in which a cylindrical through hole was formed in each lengthwise end part, and a test shaft H (shown by hatching) was borne by the connecting rod R in the through hole at one end part.

Note that the connecting rod R bore the test shaft H in a state that the sliding member 1 (shown by black painting) was attached to the through hole. The test shaft H was borne at both outsides of the connecting rod R along the axis of the test shaft H, and was rotated so that the sliding speed was 7 m/sec. The sliding speed is a relative speed between the surface of the overlay 13 and the test shaft H. The end part of the connecting rod R on the opposite side from the test shaft H was connected to a moving body F that reciprocates in the length direction of the connecting rod R, and the reciprocating load of the moving body F was set to 90 MPa. Furthermore, an engine oil having a temperature of about 140° C. was supplied between the sliding member 1 attached to the connecting rod R and the test shaft H.

The above-described state was continued for 50 hours to perform the fatigue test of the overlay 13. Then, after the fatigue test, the inner side surface (sliding surface) of the overlay 13 was photographed from a position on a straight line orthogonal to the inner side surface so that the straight line was the main optical axis, and the photographed image was obtained as an evaluation image. Then, the damaged portion in the surface of the overlay 13 photographed in the evaluation image was observed with a binocular (magnifying glass) and identified, and the percentage value obtained by dividing the damaged portion area, the area of the damaged portion, by the area of the entire surface of the overlay 13 photographed in the evaluation image was measured as the fatigue area rate.

Furthermore, a wear test piece (connecting rod R) was prepared that was formed in the same manner as the sliding member 1 of the present embodiment, and the wear amount after the wear test was measured. As the result, the wear amount was as good as 0.7 mm$^3$. The wear test was also performed with the sliding tester shown in FIG. 3. In the wear test, a state in which the sliding speed was kept at 3 m/s for 10 seconds and a state in which the sliding speed was kept at 0 m/s for 10 seconds were alternately repeated for 10 hours (1,800 cycles) continuously. The reciprocating load of the moving body F was set to 3 kPa. Furthermore, an engine oil having a temperature of about 100° C. was supplied between the sliding member 1 attached to the connecting rod R and the test shaft H. The connecting rod R had an inner diameter of 50 mm and a width of 20 mm.

The test pieces after the fatigue test and the wear test described above were observed to find that the plating adhesion between the lining 11, the first intermediate layer 12A, the second intermediate layer 12B, and the overlay 13 was good. The good plating adhesion means that delamination is not caused by the first intermediate layer 12A, the second intermediate layer 12B, and the overlay 13.

In the above-described embodiment, the overlay 13 includes not only soft Bi but also hard Sb, and as a result, the hard Sb can improve the fatigue resistance and the wear resistance. Here, Cu has a property of diffusing into Sb more easily than into Bi. If the average concentration of Sb in the overlay 13 is increased (for example, 3% by mass or more), Cu diffused from the first intermediate layer 12A into the overlay 13 may reduce the fatigue resistance.

Meanwhile, by interposing the second intermediate layer 12B including Ag, which serves as a diffusion barrier of Cu, as a main component between the first intermediate layer 12A and the overlay 13, it is possible to reduce the amount of Cu diffused from the first intermediate layer 12A including Cu as a main component into the overlay 13 to reduce the possibility of deterioration in the fatigue resistance. Furthermore, by interposing the first intermediate layer 12A including Cu as a main component between the second intermediate layer 12B including Ag as a main component and the lining 11 including an Al alloy, it is possible to reduce the possibility of delamination between the second intermediate layer 12B and the lining 11.

(1-2) Method for Manufacturing Sliding Member:

First, a molten material of a lining 11 was put into a mold, and the molten material of the lining 11 was drawn out from the opening of the mold in the casting direction to form a continuously cast sheet of the lining 11. Next, the continuously cast sheet of the lining 11 was cold-rolled until the thickness of the continuously cast sheet reached the thickness of the lining 11. Furthermore, a low-carbon steel sheet (commercial product) of a back metal 10 was cold-rolled together to pressure-bond the low-carbon steel sheet of the back metal 10 to the Al alloy sheet side of an intermediate layer 12. As described above, a rolled sheet of a sliding member 1 was formed in which the continuously cast sheet of the lining 11 and the low-carbon steel sheet of the back metal 10 were pressure-bonded to each other.

Next, the rolled sheet of the sliding member 1 was cut into a predetermined size. The predetermined size is a size in which the sliding member 1 can be formed through machining described below, and is a size determined by the shape of a connecting rod R to which the sliding member 1 is to be attached. Furthermore, the rolled sheet of the sliding member 1 after cutting was pressed to be formed into a halved cylindrical shape.

Next, Cu having a thickness of 1 μm was laminated on the surface of the lining 11 through electroplating to form a first intermediate layer 12A. Next, Ag having a thickness of 5 μm was laminated on the surface of the first intermediate layer 12A through electroplating to form a second intermediate layer 12B.

Next, Bi—Sb having a thickness of 15 μm was laminated on the surface of the second intermediate layer 12B through electroplating to form an overlay 13. The procedure of electroplating was as follows. First, the surface of the second intermediate layer 12B was washed with water. Furthermore, the surface of the second intermediate layer 12B was washed with an acid to remove an unnecessary oxide from the surface of the second intermediate layer 12B. Then, the surface of the second intermediate layer 12B was washed with water again.

After completion of the above-described pretreatment, the lining 11 immersed in a plating bath was supplied with a current to perform electroplating. The bath composition of the plating bath included methanesulfonic acid: 150 g/L, a Bi ion: 30 g/L, a Sb ion: 1 g/L, and an organic surfactant: 25 g/L. The bath temperature of the plating bath was set to 30° C. Furthermore, the current supplied to the lining 11 was a direct current, and the current density was set to 3 A/dm$^2$.

After the above-described electroplating, water washing and drying were performed. Thus, the sliding member 1 was completed. Furthermore, two sliding members 1 were combined into a cylindrical shape to form a sliding bearing A, and the sliding bearing A was attached to an engine.

(2) Experimental Results

TABLE 1

| | Overlay | | Thickness of first intermediate layer (Cu) [μm] | Thickness of second intermediate layer (Ag) [μm] | Wear amount [mm$^3$] | Fatigue area rate [%] | Plating adhesion |
|---|---|---|---|---|---|---|---|
| | Content of Bi | Content of Sb [% by mass] | | | | | |
| Example 1 | Rest | 3.0 | 1.0 | 5.0 | 0.9 | 7.0 | Good |
| Example 2 | Rest | 5.5 | 1.0 | 5.0 | 0.7 | 4.0 | Good |
| Example 3 | Rest | 7.2 | 1.0 | 5.0 | 0.6 | 2.0 | Good |
| Example 4 | Rest | 10.0 | 1.0 | 5.0 | 0.4 | 8.0 | Good |
| Example 5 | Rest | 5.5 | 1.0 | 3.0 | 0.7 | 4.0 | Good |
| Example 6 | Rest | 5.5 | 0.3 | 5.0 | 0.7 | 4.0 | Good |
| Comparative Example 7 | Rest | 0.0 | 1.0 | 5.0 | 2.4 | 38.0 | Good |
| Comparative Example 8 | Rest | 2.1 | 1.0 | 5.0 | 1.5 | 16.0 | Good |
| Comparative Example 9 | Rest | 8.5 | 1.0 | 0.0 | 0.5 | 14.0 | Good |
| Comparative Example 10 | Rest | 11.5 | 1.0 | 5.0 | 0.3 | 12.0 | Good |
| Comparative Example 11 | Rest | 13.7 | 1.0 | 5.0 | 0.2 | 24.0 | Good |
| Comparative Example 12 | Rest | 7.2 | 1.0 | 1.0 | 0.6 | 15.0 | Good |
| Comparative Example 13 | Rest | 8.5 | 0.0 | 5.0 | — | — | Not good |
| Comparative Example 14 | Rest | 8.5 | 0.1 | 5.0 | — | — | Not good |

Table 1 shows a comparison among the configurations in Examples 1 to 6 of the present invention and Comparative Examples 7 to 14. The test pieces in Examples 1 to 6 and Comparative Examples 7 to 14 are the sliding members 1 that are different in the content of Sb in the overlay 13, the thickness of the first intermediate layer 12A, or the thickness of the second intermediate layer 12B.

In Examples 1 to 6 and Comparative Examples 7 to 14, the wear amount and the fatigue area rate were measured with the above-described methods. The first embodiment corresponds to Example 2. In Examples 1 to 6, all of the wear resistance, the fatigue resistance, and the plating adhesion were good. In Comparative Examples 1 to 6, any of the wear resistance, the fatigue resistance, and the plating adhesion were not good. Note that the good wear resistance means that the wear amount is 1.0 mm$^3$ or less, and the good fatigue resistance means that the fatigue area rate is 10% or less.

As shown in Table 1, in Comparative Examples 13 and 14, the plating adhesion was not good. This is because in Comparative Examples 13 and 14, the first intermediate layer 12A had a thickness of 0 μm and 0.1 μm respectively, and the thickness of the first intermediate layer 12A was insufficient. Meanwhile, in Example 6 in which the first intermediate layer 12A had a thickness of 0.3 μm, the plating adhesion was good. It has been confirmed that the plating adhesion is good in the case that the first intermediate layer 12A has a thickness of 0.3 μm or more.

In Comparative Examples 9 and 12, the fatigue resistance was not good. This is because in Comparative Examples 9 and 12, the second intermediate layer 12B had a thickness of 0 μm and 1 μm respectively, and the thickness of the second intermediate layer 12B was insufficient. Meanwhile, in Example 5 in which the second intermediate layer 12B had a thickness of 3 μm, the fatigue resistance was good.

TABLE 2

| | Second intermediate layer | Time of measurement | Concentration of Cu [% by mass] Measurement point (distance from Cu base in overlay) | | | | | |
|---|---|---|---|---|---|---|---|---|
| | | | 1 μm | 2 μm | 4 μm | 6 μm | 9 μm | 14 μm |
| Example A | Pure Ag (2 μm) | Before heat treatment | 0 | 0 | 0 | 0 | 0 | 0 |
| | | After heat treatment | 0 | 0 | 0 | 0 | 0 | 0 |
| Example B | Ag-Sn (2 μm) | Before heat treatment | 0 | 0 | 0 | 0 | 0 | 0 |
| | | After heat treatment | 0 | 0 | 0 | 0 | 0 | 0 |
| Example C | None | Before heat treatment | 0 | 0 | 0 | 0 | 0 | 0 |
| | | After heat treatment | 14.8 | 6.2 | 2.2 | 0.9 | 0.6 | 0.3 |

Table 2 shows the results of measuring the concentration of Cu diffused into the overlay 13 before and after heat treatment. In Example A, a second intermediate layer 12B of pure Ag having a thickness of 2 μm was laminated on a Cu base. In Example B, a second intermediate layer 12B of Ag—Sn having a thickness of 2 μm was laminated on a Cu base. In Comparative Example C, a second intermediate layer 12B was omitted, and an overlay 13 was directly laminated on a Cu base. In Examples A and B and Comparative Example C, the content of Sn in the overlay 13 was set to 5% by mass. Furthermore, holding in the atmosphere at 150° C. for 50 hours was performed as heat treatment.

As shown in Table 2, in Comparative Example C in which the overlay 13 was directly laminated on the Cu base, the measurement point that is less distant from the lower interface of the overlay 13 has a larger concentration of Cu after the heat treatment. This is because Cu diffused from the base into the overlay 13 in the heat treatment. Meanwhile, as in Examples A and B, it has been confirmed that the second intermediate layer 12B including pure Ag or Ag—Sn having a thickness of 2 μm or more can sufficiently exhibit an effect of preventing diffusion of Cu into the overlay 13.

In Comparative Examples 7 and 8 in Table 1, neither the wear resistance nor the fatigue resistance was good. This is because, in Comparative Examples 7 and 8, the overlay 13 had a content of Sb of 0% by mass and 2.1% by mass respectively, and the content of hard Sb was insufficient. Meanwhile, in Example 1 in which the overlay 13 had a content of Sb of 3% by mass, both the wear resistance and the fatigue resistance were good. It has been confirmed that the overlay 13 having a content of Sb of 3% by mass or more can be strengthened, resulting in good wear resistance and good fatigue resistance.

Furthermore, in Comparative Examples 10 and 11, the fatigue resistance was not good. This is because the overlay 13 had a content of Sb of 11.5% by mass and 13.7% by mass respectively, and the quality of the plating film of the overlay 13 deteriorated due to excessive Sb. Meanwhile, in Example 4 in which the overlay 13 had a content of Sb of 10% by mass, both the wear resistance and the fatigue resistance were good. It has been confirmed that the quality of the plating film can be maintained in the overlay 13 having a content of Sb of 10% by mass or less, resulting in good wear resistance and good fatigue resistance.

(3) Other Embodiments

In the above-described embodiment, the sliding member 1 is exemplified that constitutes the sliding bearing A that bears a crankshaft of an engine, but the sliding member 1 of the present invention may be used for forming a sliding bearing A for another application. For example, the sliding member 1 of the present invention may be used for forming a radial bearing such as a gear bush or a piston pin bush/boss bush for a transmission. Furthermore, the sliding member of the present invention may be a thrust bearing, various washers, or a swash plate for a car air conditioner compressor. The matrix of the lining 11 is not limited to a Cu alloy as long as the material of the matrix is selected according to the hardness of the mating shaft 2. The back metal 10 is not essential and may be omitted.

REFERENCE SIGNS LIST

1 Sliding member
2 Mating shaft
10 Back metal
11 Lining
12 Intermediate layer
12A First intermediate layer
12B Second intermediate layer
13 Overlay
A Sliding bearing
F Moving body
H Test shaft
R Connecting rod

The invention claimed is:
1. A sliding member comprising:
an overlay including an alloy plating film of Bi and Sb;
a lining including an Al alloy;
a first intermediate layer including Cu as a main component, and laminated on the lining; and a second intermediate layer including Ag as a main component, and connecting the first intermediate layer and the overlay;

wherein a thickness of the second intermediate layer is 2 μm or more and less than 4 μm.

2. The sliding member according to claim 1, wherein the second intermediate layer includes pure Ag or Ag—Sn.

3. The sliding member according to claim 1, wherein the thickness of the second intermediate layer is 2 μm or more and 3 μm or less.

* * * * *